March 1, 1955
H. W. SIMPSON
2,703,155
SELF-ENERGIZING BRAKE
Filed July 17, 1950
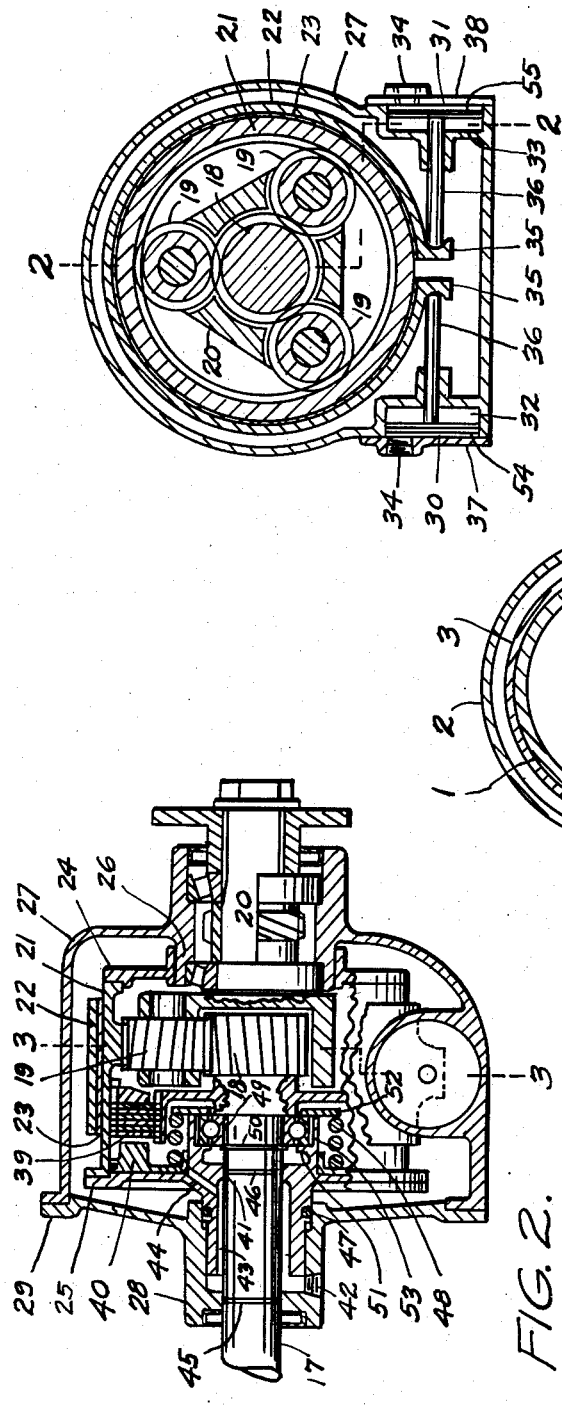
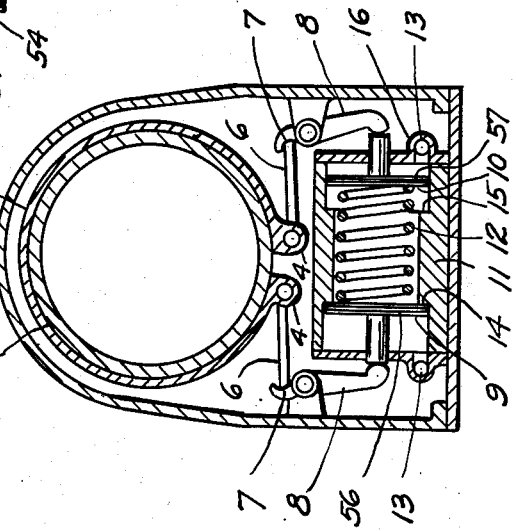
INVENTOR.
HOWARD W. SIMPSON.
BY
Barnes, Kisselle, Laughlin & Raisch

United States Patent Office 2,703,155
Patented Mar. 1, 1955

2,703,155

SELF-ENERGIZING BRAKE

Howard W. Simpson, Dearborn, Mich.

Application July 17, 1950, Serial No. 174,315

10 Claims. (Cl. 188—77)

This invention relates to a self-energizing brake.

In a multi-speed planetary transmission a brake is used to hold one element of the planetary train stationary. The part so held becomes a reaction member of a gear train for multiplying torque. The brake band is usually designed to increase its own holding power by self-energizing action. For such action the brake band is made sufficiently flexible to permit it to bend inward against the drum when the ends are pressed together. The wrapping or self-energizing action increases the holding power of the brake so that if one end is held against a stop, a small initial force against the other end of the band suffices to stop the rotation of the brake drum and hold it after it has stopped against the reaction torque. Such brakes are usually applied by hydraulic power or by spring pressure and the reaction torque is usually only in one direction. However, in the following cases brakes are subjected to reaction torque in both directions: (1) when a single brake holds the reaction member of a forward speed train and also of a reverse speed train as in my copending application Serial No. 554,353, now Patent No. 2,518,824, (2) when a brake is used for both a forward underdrive and a forward overdrive ratio, and (3) when a planetary brake is used in a secondary transmission connected to a primary transmission having both forward and reverse speeds. Such brakes must self-energize in both directions and an object of the invention is to produce such a brake.

It is also an object of this invention to support the brake drum in the housing of the transmission in a more stable manner. Such drums are usually mounted in a single bearing which permits the drum to wobble. This is avoided by having two bearings spread several inches apart as shown in this application.

In my parent application Serial No. 554,353, now Patent No. 2,518,824, issued August 15, 1950, Figs. 17 and 24 show the brake applied by spring pressure and released by oil pressure. Figs. 17 and 24 are replaced by Fig. 1 in this application which shows the same construction.

In this application Figs. 2 and 3 are added which show the alternate method mentioned of applying the brake by hydraulic pressure instead of springs.

Fig. 1 is shown as part of a primary transmission whereas Figs. 2 and 3 show a secondary or auxiliary transmission but either method of applying the brake could be used in either type of transmission.

Fig. 1 is a cross section through a planetary transmission, brake drum and cylinder.

Fig. 2 is a longitudinal or axial cross-section through an auxiliary transmission on line 2—2 of Fig. 3.

Fig. 3 is a transverse cross-section through the brake and hydraulic cylinder on line 3—3 in Fig. 2.

In Fig. 1, the brake drum 1 is mounted on housing 2. Brake band 3 has ears 4 which provide pivots for struts 6. The struts contact sockets 7 in levers 8 pivotally mounted in and on housing 2. Since this brake energizes in both directions, two pistons 9 and 10 are used in cylinder 11 and having spring 12 between them tending to force them outward against levers 8. Struts 6 close the band 3 on drum 1. Piston rings 56 and 57 are used on pistons 9 and 10 to seal oil pressure.

The brake is released by oil under pressure entering both ends of cylinder 11 at openings 13. Oil under pressure is supplied to ports 13 by any suitable means (not shown) such as a gear pump as shown in my parent application Serial No. 554,353, now Patent No. 2,518,824, issued August 15, 1950. This compresses spring 12 until the pistons come to and abut shoulders 14 and 15 in the cylinder. The band 3 in its free position has its inner diameter larger than the outside diameter of drum 1 which makes it self-opening when released.

In operation the brake is applied by exhausting the fluid pressure or oil from cylinders 11 which allows the spring to force the band against the drum. If the drum is rotating or tending to rotate clockwise, the band will attempt to rotate clockwise also, causing both band ears 4 to move to the left as in Fig. 1 and both pistons to move to the right. Since the pressure of spring 12 is on both pistons it does not oppose this movement but when the left hand piston 9 reaches shoulder 14 in cylinder 11 it is held as shown in Fig. 1. The design is such that when this occurs there is clearance between the right hand piston 10 and the cylinder head 16 as shown in Fig. 1 which allows it to transmit the force of spring 12 to the brake band. Even though the force of the spring is applied to both brake ears 4, the self-energizing action opposes any outward motion of piston 9 but does not oppose such motion of piston 10. Shoulder 14 acts as a stop to which the brake drum torque is transmitted. If the rotation of drum 1 is counterclockwise, piston 10 is held against stop shoulder 15 because band 3 energizes and tends to turn in a counterclockwise direction.

In Fig. 2 input shaft 17 is integral with sun gear 18 which meshes with planets 19 mounted in carrier 20 which is the output member of this auxiliary transmission. Internal ring gear 21 is also a brake drum. Band 22 with friction lining 23 rests on this drum but, in its free position, has clearance and so does not hold the brake drum. Brake drum heads 24 and 25 have hubs for supporting the brake drum.

Head 24 is supported and rotates on hub 26 of housing 27 and head 25 turns inside of hub 28 of end plate 29. Head 25 has clearance at its inner diameter 41 so that radial loads cannot be transmitted to shaft 17.

In Fig. 3 pistons 30 and 31 are located in cylinders 32 and 33 in housing 27. Piston rings 54 and 55 are used on pistons 30 and 31 to seal pressure. Openings 34 admit pressure oil simultaneously forcing pistons 30 and 31 to move toward each other. This movement is transmitted to brake band ears 35 by piston rods 36.

Cylinder heads 37 and 38 form stops for pistons 30 and 31 and also seal them to prevent escape of oil pressure except through openings 34.

In Fig. 2 multiple disc clutch 39 is engaged by hydraulic piston 40 by oil pressure entering at opening 42 and passing through annular space 43 and hole 44. This oil pressure is sealed by rings 45, 46 and 47. Rings 45 and 46 are in grooves in shaft 17 but ring 47 is located in a groove in the hub of head 25 so that the oil which operates clutch 39 is made to pressure lubricate the hub of head 25 running inside of hub 28 of housing plate 29. When the clutch is not engaged, retracting spring 48 exhausts oil pressure back out through opening 42 and there is then no need of oil as the brake drum is held stationary in hub 28, there being no neutral in this unit.

Thrust bearing 49 held on shaft 17 by snap ring 50 takes end thrust loads from both the sun gear 18 and ring gear 21. These thrust loads are equal and opposite in direction and thus balance each other. The outer race of bearing 49 is located between a shoulder 51 inside the hub and plate 52 but there is radial clearance at 53 between the hub and the outside of the bearing so no radial load can be transmitted from the brake drum 21 to shaft 17. Due to this construction all gear end thrust is self-contained and so there are no thrust loads on housing 27 or plate 29.

In operation, if the forward or primary transmission is in low gear the input shaft 17 and sun gear 18 will turn counterclockwise in Fig. 3. Planets 19 will tend to turn brake drum 21 clockwise but if the brake is applied the brake drum will be held and carrier 20 will rotate counterclockwise at a speed slower than that of input shaft 17. When the brake is applied by pistons 30 and 31 they move toward each other till the band clamps the drum, causing the band to rotate slightly clockwise with the drum. This forces piston 30 to the left until it is stopped by cylinder head 37.

If the primary transmission is in reverse drive, drum 21 attempts to turn counterclockwise and likewise the band will turn with the drum slightly until piston 31 stops against cylinder head 38. In Fig. 3 pistons 30 and 31 are in against cylinder heads 37 and 38, and the pressure oil has been exhausted from cylinders 32 and 33 through ports 34. The pistons are forced to this position by the self-opening force of the flexible or resilient band when no oil pressure is entering the cylinders. With the pistons in the positions shown, band 22 hangs loosely on the drum but since the amount of clearance is small, it is not shown in Fig. 3.

Thus, one piston presses against its cylinder head to form a stop for one ear of the brake band and the other piston applies force against the other ear, no matter which direction the drum rotates or tends to rotate.

The brake drum has large radial loads imposed on it by the band which must be supported on adequate bearings. Since the drum becomes stationary when the brake is applied, the drum is supported in stationary bearings in the housing 27 and housing plate 29. This prevents loads from the brake drum from being transmitted to any rotating parts where it would cause wear.

This application is a continuation-in-part of my co-pending application Serial No. 554,353, filed September 16, 1944, now Patent No. 2,518,824, issued August 15, 1950.

As shown in Fig. 1, the opposite ends of cylinder 11 serve as cylinders in which pistons 9 and 10 reciprocate and these cylinders as a matter of convenience or preference are integral.

I claim:

1. In a planetary transmission, a self-energizing brake comprising a brake drum, a brake band wrapped around said drum, the opposite ends of said brake band both being movable circumferentially of said drum, cylinders, pistons in said cylinders, piston rods projecting out of the ends of said cylinders, levers operatively connected to said piston rods and the ends of the brake band for applying braking pressure thereto, a compression spring biasing both pistons in a direction for applying braking pressure, stops limiting the compression of said spring whereby when braking pressure is applied one or the other of said stops automatically acts as an anchor point through the piston and lever for wrapping action of the brake band depending upon the direction of rotation of the member being braked.

2. In a transmission, a self-energizing brake comprising a brake drum, a brake band, said brake band and each of the opposite ends thereof being movable circumferentially of the brake drum, a hydraulic cylinder, opposed pistons in said cylinder, a conduit whereby fluid under pressure is admitted to said cylinder to move the pistons toward each other, stops for limiting the movement of said pistons toward each other, a compression spring between said pistons, lever means connecting the pistons with the brake band whereby each end of the brake band is actuated through leverage when fluid pressure on the pistons is relieved, one or the other of said stops acting as an anchor point through the piston and lever for wrapping action of the brake band depending upon the direction of rotation of the drum.

3. A brake comprising a brake drum, a flexible brake band bodily movable circumferentially of the brake drum, a pair of cylinders, a piston in each cylinder, a connection between each piston and one of the opposite ends of said brake band, resilient means biasing said pistons in braking direction whereby when pressure is applied against said pistons by said resilient means the brake band is moved into braking relation with said drum, stop means for limiting the travel of each of said pistons whereby when pressure is applied to said pistons the brake band is forced against the drum and the band tends to rotate in the direction of rotation of the drum until one of said pistons abuts its stop whereupon the other of said pistons applies force to the brake band to bring it into braking relation with the drum.

4. The combination claimed in claim 3 including means for opening the brake band into non-braking relation with the brake drum when the braking pressure on the pistons is relieved.

5. The combination claimed in claim 3 wherein the brake band is flexible and resilient and is self-opening into non-braking relation with the drum when the braking pressure on the pistons is relieved.

6. A self-energizing brake comprising a brake drum, a brake band having opposed ends, said brake band and said opposite ends thereof being bodily movable circumferentially of said brake drum, a pair of cylinders, a pair of pistons in said cylinders, a connection between one piston and the one end of the said brake band, a connection between the other piston and the other end of said brake band, means for applying pressure to said pistons whereby the ends of said brake band tend to move toward each other, stops for limiting the travel of each of said pistons in its respective cylinder whereby when braking pressure is applied to said pistons the frictional effect of the rotating drum on the brake band causes the one piston to move against its stop to hold one end of the brake band against rotation with the brake drum and the other piston applies braking force against the other end of the brake band to effect a self-energizing braking action.

7. The combination claimed in claim 6 wherein the cylinder heads act as stops for said pistons.

8. The combination claimed in claim 6 wherein each cylinder and piston is mounted in axially opposed relation to the other cylinder and piston.

9. The combination claimed in claim 8 including a spring mounted between said pistons and tending to move them apart in the application of the braking band to said drum.

10. A self-energizing brake comprising a support, a brake drum rotatable on said support, a flexible brake band partially encircling said drum and having opposite free ends, said brake band and said opposite free ends thereof being bodily movable circumferentially of said brake drum, dual hydraulic cylinder and piston means operatively connected to the free ends of said brake band to close the band around said drum, resilient means exerting a force on said piston means in a direction parallel to the axis of said cylinder means, hydraulic means for exerting a force on said piston means in the opposite direction, said cylinder means being fixedly mounted on said support and including stops thereon against which said piston means are engageable to limit the circumferential movement of said band on said drum in both directions of rotation.

References Cited in the file of this patent

UNITED STATES PATENTS

| Number | Name | Date |
|---|---|---|
| 1,528,966 | Berger | Mar. 10, 1925 |
| 1,707,877 | Roberts | Apr. 2, 1929 |
| 1,820,061 | Flagg | Aug. 25, 1931 |
| 1,844,037 | Heinish | Feb. 9, 1932 |
| 2,126,849 | Weiss | Aug. 16, 1938 |
| 2,182,386 | Patterson | Dec. 5, 1939 |
| 2,275,142 | Hale | Mar. 3, 1942 |
| 2,328,619 | Cox | Sept. 7, 1943 |
| 2,343,334 | Sharpe | Mar. 7, 1944 |
| 2,429,163 | Lee | Oct. 14, 1947 |